Dec. 13, 1955  R. A. FINDLAY  2,726,998
PROCESS AND APPARATUS FOR SHALE OIL EXTRACTION
Filed July 11, 1949  3 Sheets-Sheet 1

INVENTOR.
R. A. FINDLAY
BY Hudson and Young
ATTORNEYS

Dec. 13, 1955  R. A. FINDLAY  2,726,998
PROCESS AND APPARATUS FOR SHALE OIL EXTRACTION
Filed July 11, 1949  3 Sheets-Sheet 2

INVENTOR.
R. A. FINDLAY
BY *Hudson and Young*
ATTORNEYS

> United States Patent Office 2,726,998
Patented Dec. 13, 1955

2,726,998

PROCESS AND APPARATUS FOR SHALE OIL EXTRACTION

Robert A. Findlay, Bartlesville, Okla., assignor to Phillips Petroleum Company, a corporation of Delaware Application July 11, 1949, Serial No. 104,043

19 Claims. (Cl. 202—14)

This invention relates to the production of organic material from oil-bearing solids. In one of its more specific aspects, it relates to the separation of hydrocarbons from oil-bearing shale. In another of its more specific aspects, it relates to the removal of oil from oil-bearing shale in a vaporous state. In another of its more specific aspects, it relates to a process for removing organic material from a fluent mass of oil-bearing solids.

It has long been known that oil can be obtained from carbonaceous solid materials, such as shale. The recovery of the oil from such solid materials has heretofore proved to be quite uneconomical in this country. Conventional recovery of oil from oil-bearing solid material has been accomplished by heating or roasting the oil-bearing shale at high temperatures sufficient to cause the oil to be dissociated therefrom. Such processes generally have been confined to stationary beds, with the result that only batchwise operation could be employed and frequent shutdowns have been required so as to remove the resulting coke formation and to charge fresh shale. Generally speaking, this invention comprises an improvement in the removal of oil material from oil-bearing solids by the removal of the oil from a hot fluent mass of the oil-bearing solid. The hydrocarbon oil is removed from the presence of the fluent oil-bearing mass in a vaporous state, thus preventing the wetting of the stripped solid material with the oil.

An object of this invention is to provide means for separating organic material from carbonaceous solids. Another object of the invention is to provide a method for removing organic material from a fluent mass of oil-containing solids. Another object of the invention is to provide a method for utilizing carbon, formed while stripping oil-bearing solids, as a portion of the fuel to provide heat for the stripping step. Another object of the invention is to provide a continuous circulation method for removing organic material from oil-containing shale. Other and further objects and advantages will be apparent from the accompanying disclosure and the drawings.

Figure 2:
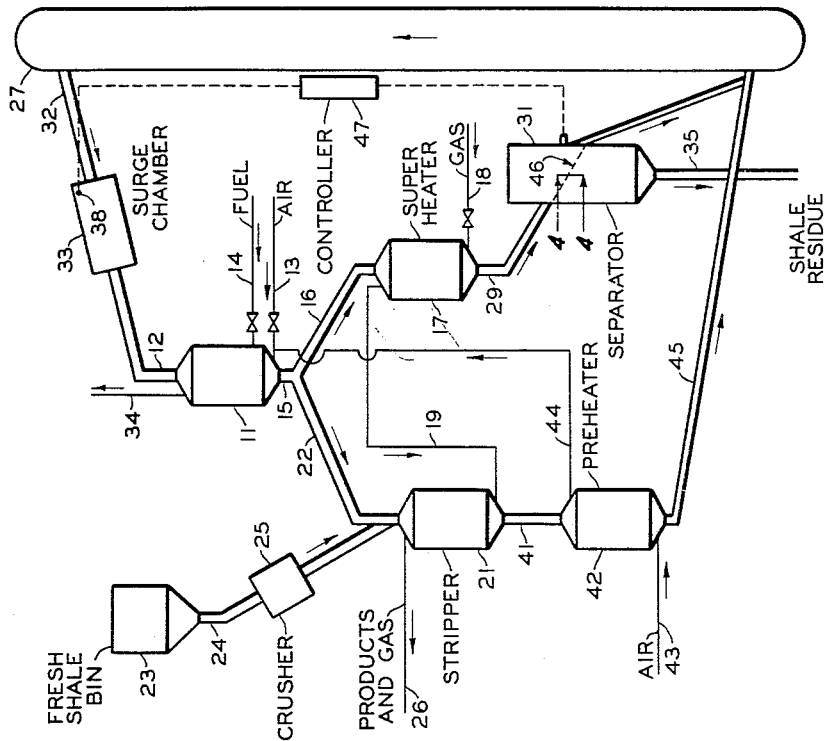
Figure 1:
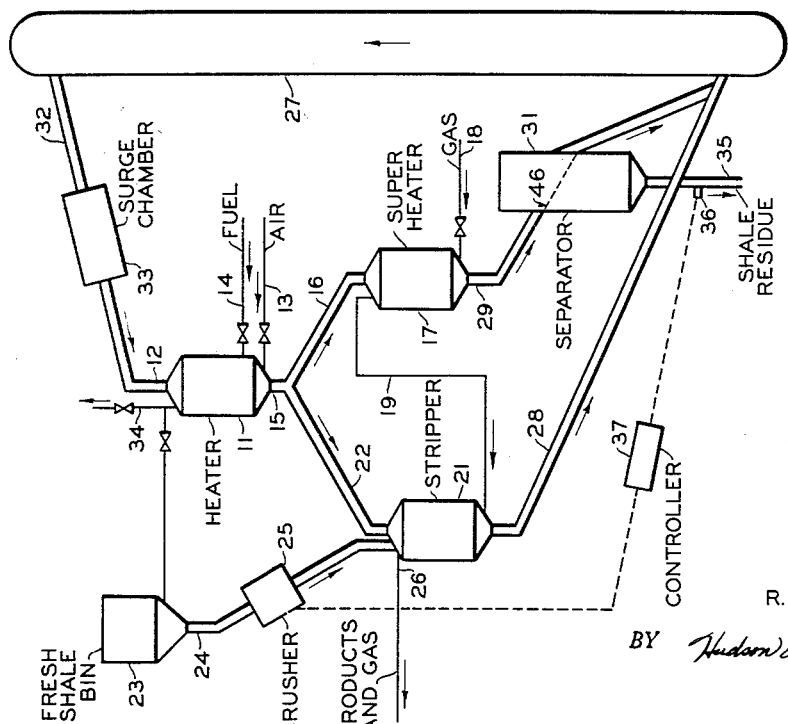
Figure 3:
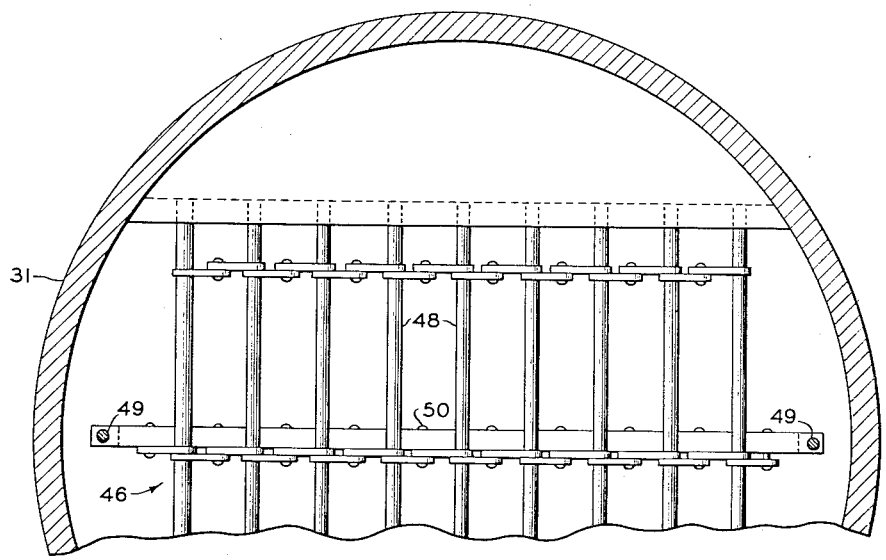
Figure 4:
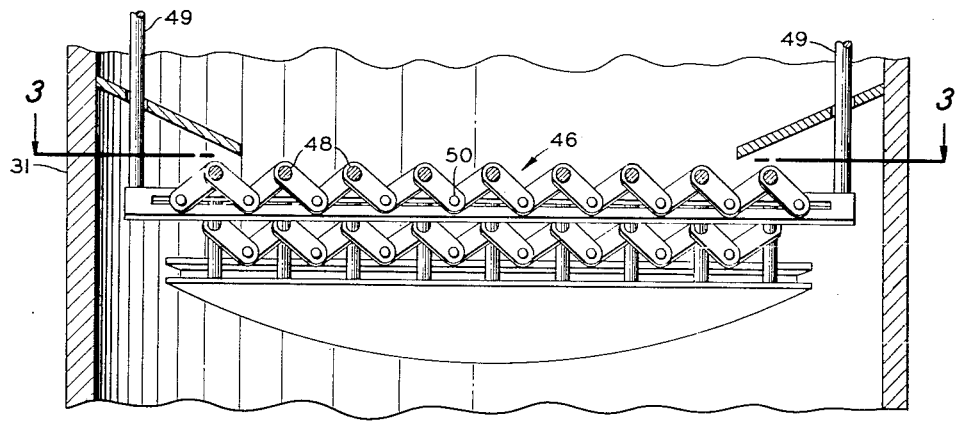
Figure 1A:
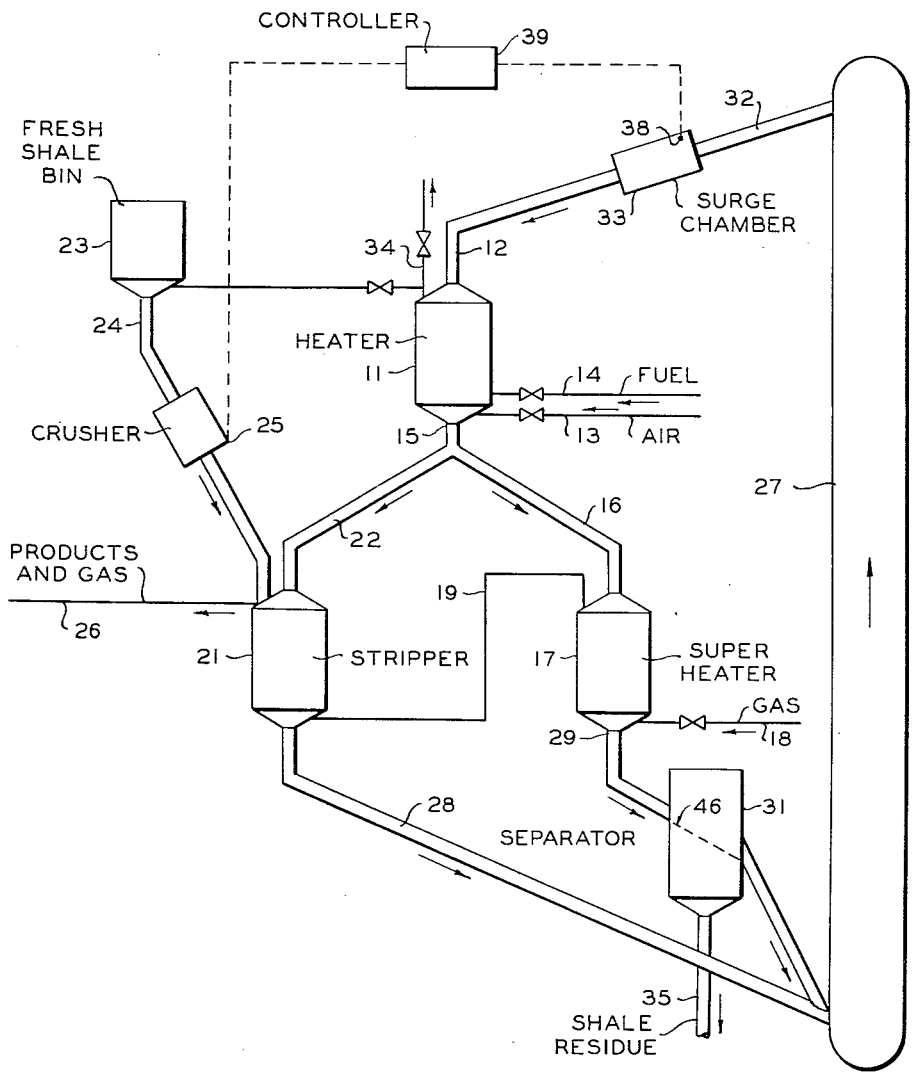

Better understanding of the invention will be obtained upon reference to the drawings in which Figure 1 is a diagrammatic disclosure of the structure and flow plan of this invention. Figure 1a illustrates a modification of the structure and flow plan of Figure 1. Figure 2 is a schematic portrayal of a preferred modification of this invention. Figure 3 is a plan view of an adjustable grill which is used as a separation means in the separator of Figure 2. Figure 4 is an end view of the adjustable grill of Figure 3.

Referring particularly to the system set forth in Figure 1 of the drawings, solid heat exchange material is supplied to heater 11 through solid material inlet conduit 12. The solid heat exchange material which is supplied to heater 11 may be either stripped shale or a mixture of stripped shale and refractory heat exchange pebbles. In those instances in which the solid heat exchange material is stripped shale, a large portion of the heat necessary to heat the shale may be supplied by the oxidation of the carbon which is formed on the shale during the stripping step. With certain shales enough carbon is present to supply heat in excess of that required for stripping and this excess may be used for other purposes, such as steam production, in apparatus not shown. Air or oxygen is supplied to the lower portion of heater chamber 11 through gaseous material inlet conduit 13. When refractory heat exchange pebbles are utilized as a portion of the solid heat exchange material, it is ordinarily necessary to supply additional fuel for combustion so as to provide additional heat for the solid heat exchange material. The additional fuel is supplied to the lower portion of heater 11 through fuel inlet conduit 14. The outlet ends of conduits 13 and 14 form heating means in the lower portion of heater 11. Additional fuel is at times also utilized for the purpose of heating the stripped shale. The additional fuel is in one modification injected directly into the lower portion of heater chamber 11 and is burned on the surface of the solid heat exchange material. In another modification, a separate combustion zone is maintained in the lower portion of the heater chamber or adjacent the periphery of the heater chamber at its lower end. The fuel is burned in the separate combustion chamber and hot combustion gas is passed into the lower portion of the heater chamber.

The process of this invention is quite flexible and it is possible to utilize a temperature within a considerable temperature range for the purpose of stripping the oil-bearing solid material. It is ordinarily desirable to heat the solid heat exchange material in heater 11 to a temperature not above 2500° F. When stripped shale is utilized as the solid heat exchange material or as a portion of such solid heat exchange material, it is necessary to maintain the temperature in heater 11 at a temperature at which sintering of the shale will not occur. It is preferred to operate heater 11 within a temperature range of from about 1500° F. to about 2000° F. Fusion of the shale is thus prevented and the solid heat exchange material is maintained in the form of a freely flowing, gas pervious mass. The heated solid heat exchange material is removed from the lower portion of heater 11 through outlet conduit 15. A portion of the solid heat exchange material is passed by means of conveyor 16 to the upper portion of superheater chamber 17. An inert stripping gas, such as steam, is passed into the lower portion of superheater chamber 17 through gaseous material inlet conduit 18. The stripping gas passes upwardly through superheater chamber 17 countercurrent the flow of the heated solid heat exchange material and is removed from the upper portion of superheater chamber 17 through conduit 19 in a superheated condition.

A second portion of the heated solid heat exchange material is conveyed to stripper chamber 21 through conveyor 22. Fresh oil-bearing solid material from shale bin 23 is passed by means of conveyor 24 through crusher system 25 to the upper portion of stripper chamber 21. The fresh oil-bearing solid material mixes with the heated solid heat exchange material from heater 11 and passes downwardly through stripper chamber 21. The fresh oil-bearing solid material is heated in a direct heat exchange with the solid heat exchange material within stripper chamber 21. The superheated stripping gas is conveyed through conduit 19 to the lower portion of stripper chamber 21 and flows upwardly through chamber 21 countercurrent to the flow of fluent gas-pervious mass of solid material flowing downwardly through the chamber. In the direct heat exchange between the fresh oil-bearing solid material and the two heat exchange mediums, i. e., the heated solid heat exchange material and the superheated stripping gas, kerogen, which is a solid organic material in oil shale, is decomposed sufficiently to yield a great portion of its oil content. The oil is separated from the solid material in a vaporous state under the influence of high temperature and the stripping gas. Condensation of the oil vapors is substantially prevented by the up-flow of superheated stripping gas through the stripper chamber. Should any condensation take place and any liquid oil tend to flow downwardly through the chamber with the solid materials, it is vaporized by the stripping action of the hot stripping gas. Loss of liquid oil by absorption in the solid shale material is one of the factors which has heretofore made the recovery of shale oil uneconomical. By my invention the hydrocarbon materials are removed from the shale as vapors and liquid oil is not allowed to be retained by the shale. Economy is further obtained by utilizing the carbon which is deposited on the shale as a part of the fuel. Operation in this manner may be carried on at lower temperatures than are utilized in fixed bed operation or in a system in which flow of stripping gas and shale is concurrent. Condensation is prevented in the upper portion of the chamber by the inflow of heated solid heat exchange material. The vaporous oil products and the stripping gas are removed from the upper portion of chamber 21 through effluent outlet conduit 26.

Converted kerogen leaves coke as a residue on the stripped shale in the stripping step. The coke or carbon-bearing shale is removed from the lower portion of chamber 21 and is conveyed to the lower portion of elevator 27 through conveyor 28. Solid heat exchange material is removed from the lower portion of superheater chamber 17 and is conveyed by means of conveyor 29 through separator 31 to the lower portion of elevator 27. Separator 31 is provided with a vibratory or stationary grill or screen over which the solid heat exchange material is caused to pass. Small particles, better known as fines, fall through the screen and are separated from the larger particles. The solid material from stripper chamber 21 and from separator 31 is elevated by means of elevator 27 to conveyor 32 and is conveyed through surge chamber 33 to inlet conduit 12 in the upper portion of heater 11. Effluent material from heater 11 is removed through effluent outlet conduit 34.

It is necessary to control the volume of the solid material within the stripping system so as to prevent overloading of the system. In one modification of the invention, the volume of the discarded fines which are removed from the bottom portion of separator 31 through residue outlet conduit 35 is measured by volume indicator 36. Controller 37 causes the crushing tension of crusher 25 to be varied in response to the volume measured by volume indicator 36. Thus the size of the oil-bearing shale particles which are supplied to the system is decreased as the volume of shale fines removed from the lower portion of separator 31 decreases. As the volume of shale fines removed from separator 31 increases, controller 37 causes the crushing tension of crusher in system 25 to decrease, thus increasing the size of the oil-bearing shale which is supplied to stripper chamber 21. With the mesh-size of the screen in separator 31 fixed, an increase in the average particle size permits more of the solids to pass over the screen and be retained in the system while a decrease in particle size permits less of the solids to be retained in the system.

In another modification of the invention as illustrated in Figure 1a, the solid material level within surge chamber 33 is measured by level indicator 38 and controller 39 causes the crushing tension of crusher 25 to vary in response to the solid material level within the surge chamber. As the level of solid material builds up within surge chamber 33, controller 39 causes the crushing tension of crusher 25 to increase so as to reduce the particle size of oil-bearing shale which is supplied to stripper chamber 21. As the solid material level within chamber 33 decreases, controller 39 causes the crushing tension of crusher 25 to decrease, thus causing the particle size of oil-bearing shale supplied to stripper chamber 21 to be increased. The separating means of this device may also be varied by utilizing a plurality of different mesh screens in series or in stacks and fines which pass through any desired screen may be discarded while the balance of the solid material is recycled.

Referring now to Figure 2, solid heat exchange material is supplied to the upper portion of heater 11 through solid material inlet conduit 12. Air or oxygen is supplied to the lower portion of heater 11 through inlet conduit 13. Fuel which is required over and above the carbon on the solid heat exchange material is supplied to the lower portion of heater chamber 11 through inlet conduit 14. The solid heat exchange material within heater chamber 11 is heated by the oxidation of its carbon content and, on occasion, by the burning of additional fuel and the passage of hot combustion gas upwardly through heater 11. Effluent material is removed from the upper portion of heater 11 through effluent outlet conduit 34. Heater solid heat exchange material is removed from the lower portion of heater 11 through outlet conduit 15. A first portion of the heated solid heat exchange material is supplied to superheater chamber 17 through conveyor 16. Stripping gas is supplied to the lower portion of superheater chamber 17 through gaseous material inlet conduit 18. The stripping gas is passed upwardly through the downflowing fluent mass of heated solid heat exchange material and is removed from the upper portion of superheater chamber 17 in a superheated condition through effluent outlet conduit 19.

A second portion of the heated solid heat exchange material is supplied to the upper portion of stripper chamber 21 through conveyor 22. Fresh oil-bearing shale is passed from shale bin 23 by means of conveyor 24 through crusher 25 to the upper portion of stripper chamber 21. The fresh oil-bearing shale is mixed with the heated solid heat exchange material and is itself heated in the direct heat exchange therebetween. The mixture of solid materials flows downwardly through stripper chamber 21 as a fluent mass. Superheated stripping gas is supplied through conduit 19 to the lower portion of stripper chamber 21 and flows upwardly therethrough providing the additional heat and stripping effect to remove vaporous hydrocarbon oil from the solid materials. The vaporous products and the stripping gas are removed from the upper portion of stripper chamber 21 through effluent outlet conduit 26.

The stripped solid material is removed from the lower portion of stripper chamber 21 and is passed by means of solid material conduit 41 into the upper portion of pre-heater chamber 42. Oxygen, air, or some other oxygen-supplying gas, is supplied to the lower portion of pre-heater chamber 42 through inlet conduit 43. The oxygen-supplying gas is passed upwardly through chamber 42 in direct heat exchange with the downflowing mass of solid material and is removed from the upper portion of chamber 42 through outlet conduit 44 in a heated condition. The heated oxygen-supplying gas is supplied to inlet conduit 13 and is in turn supplied to the lower portion of heater chamber 11. Solid material is removed from the lower portion of pre-heater 42 and is passed by means of conveyor 45 to the lower portion of elevator 27. Solid material is removed from the lower portion of superheater chamber 17 and is passed by means of conveyor 29 through separator 31 to the lower portion of elevator 27. Solid material fines are removed from the lower portion of separator 31. The solid heat exchange material is elevated by means of elevator 27 to conveyor 32 which conveys the solid heat exchange material through surge chamber 33 to solid material inlet conduit 12 in heater chamber 11.

Separator 31 is provided with a variable grill 46, as shown in Figures 3 and 4 of the drawings. Solid material level within surge chamber 33 is measured by a solid material level indicator 38 and controller 47 varies the opening or closing of grill 46 in accordance with the solid material level in surge chamber 33. As the solid material level within surge chamber 33 increases, controller 37 causes the openings in grill 46 to increase in size so as to increase the amount of shale residue which is removed from the lower portion of separator 31 through residue outlet 35. As the solid material level within surge chamber 33 decreases, the openings in grill 46 are decreased so as to reduce the amount of shale material which is removed from separator 31.

The ends of the grill rods 48 extend into slots in the walls of separator 31 and slide therein as regulator arms 49 are caused to move up or down by controller 47. The space between the grill rods 48 is thus diminished as regulator arms 49 are forced downwardly and force knuckles 50 downwardly. The space between grill rods 48 is increased as the regulator arms move upwardly. The size of the fresh oil-containing shale supplied to stripper chamber 21 generally varies between about ¼ inch and 2 inches in diameter. In those instances in which refractory pebbles are used as a portion of the solid heat exchange material, it is necessary that the oil-bearing solid material be sized considerably smaller than when only stripper shale is used as the solid heat exchange material. It is likewise necessary to provide a grill in separator chamber 31 which will substantially prevent the passage of refractory heat exchange pebbles of a selected size but which will allow the smaller particles of stripped shale to pass therethrough. Stripped shale which has once been passed through the heater chamber is inferior to the refractory pebbles as a further heat exchange medium. The shale is therefore separated from the pebbles in separator 31. Shale does not have the heat capacity that refractory pebbles do. Once the carbon deposit on the stripped shale has been removed, the advantage of the shale is removed.

The kerogen begins to decompose within the temperature range of about 440° F. to about 660° F. All the oil material formed from the decomposition of the kerogen is substantially completely removed from the shale at a temperature within the range of between 840° F. and 1020° F. The temperature in the stripper chamber is therefore maintained at between about 450° F. and about 1200° F. The temperature is preferably limited to a range of between 850° F. and 1050° F. The exact temperature range which is utilized is dependent upon the type of oil-bearing shale which is stripped. The shale going to the stripper chamber is generally mixed in a ratio of between 5:1 to 10:1 of fresh oil-bearing shale to shale from the heater chamber. It is preferred, however, to maintain the ratio of fresh oil-bearing shale to heated solid heat exchange material to a ratio of between 2:1 to 1:2 which is accomplished by utilizing refractory heat exchange pebbles as a portion of the solid heat exchange material.

This system is also modified so as to make possible the preheating of the fresh shale by means of flue gas from heater chamber 11. The flue gas may be passed through a branch of outlet conduit 34 to the lower portion of fresh shale bin 23 as shown in Figure 1. Waste heat is removed from the flue gas in the direct heat exchange between the flue gas and fresh shale.

Further modifications will be immediately apparent to those skilled in the art upon study of the accompanying disclosure and the drawings. It is believed that those modifications fall within the spirit and the scope of this disclosure.

I claim:

1. The method of stripping organic material from shale which comprises gravitating crushed stripped shale through a heater zone as a flowing contiguous solid material bed; heating said stripped shale in said heater zone; removing said heated stripped shale from said heater zone; gravitating a first portion of said heated stripped shale through a superheating zone; gravitating a second portion of said heated stripped shale to the upper portion of a stripping zone; gravitating crushed organic material-containing fresh shale to the upper portion of said stripping zone to admix in direct heat exchange relation with said second portion of said heated stripped shale so as to form a flowing contiguous solid material bed therein; gravitating said mixed shale bed downwardly through said stripping zone; passing an inert stripping gas into the lower portion of said superheating zone and upwardly therethrough in direct heat exchange with said heated stripped shale; removing said stripping gas from the upper portion of said superheating zone in a superheated condition; passing said heated stripping gas into the lower portion of said stripping zone and upwardly through said flowing shale bed therein, whereby the combined influence of said heated stripped shale and said stripping gas decomposes kerogen in said fresh shale and organic material is removed from the upper portion of said stripping zone in the form of vapors; removing said stripping gas and said organic products from said stripping zone in a gaseous form; gravitating stripped shale from said superheating zone and separating a controlled amount of shale fines therefrom; gravitating stripped shale from said stripping zone; and elevating said stripped shale from said superheating zone and said stripping zone to said heater zone.

2. The method of claim 1, wherein spent shale from said stripping zone is gravitated through a pre-heating zone; oxygen-supplying gas is passed through said preheating zone in direct heat exchange with said spent shale, whereby said gas is heated and said shale is cooled; elevating said shale to the upper portion of said heater zone; and passing said oxygen-supplying gas and a fuel material to the lower portion of said heater.

3. The method of claim 1, wherein said stripped shale in said heater zone is heated by the passage upwardly through said heater zone of a hot combustion gas with oxygen in excess of that required to support combustion of any fuel material introduced therewith, whereby any carbon on said shale is oxidized and said shale is heated.

4. The method of claim 1, wherein said stripped shale in said heater zone is heated by the passage upwardly through said heater zone of an oxygen-supplying gas, whereby carbon on said shale is oxidized and provides heat for said shale heating.

5. A method for stripping crushed shale which comprises heating shale in a heater zone as a solid heat exchange medium; withdrawing said hot solid heat exchange material from the lower portion of said heater zone; passing a first portion of said solid heat exchange material downwardly through a stripping zone; passing crushed oil-containing shale into the upper portion of said stripping zone in direct heat exchange with said solid heat exchange medium and concurrent with the flow thereof through said stripping zone; passing a second portion of said hot solid heat exchange medium into the upper portion of a superheating zone and downwardly therethrough; passing gaseous material into the lower portion of said superheating zone and upwardly therethrough in direct heat exchange with said hot solid heat exchange medium and counter to the flow thereof; removing said gas in a superheated state from the upper portion of said superheating zone; passing said superheated gas into the lower portion of said stripping zone in direct heat exchange relation with the downwardly flowing materials therein and counter to the flow thereof, whereby any vaporizable hydrocarbon material contained in said downwardly flowing shale material is vaporized by the combined influence of the hot solid heat exchange material and said stripping gas and is swept upwardly through said stripping zone; removing said gas and said vaporized material from the upper portion of said stripping zone; removing solid heat exchange material from the lower portion of said stripping zone; passing said solid heat exchange material to the upper portion of said heating zone; removing said second portion of solid heat exchange medium from the lower portion of said superheating zone; separating therefrom a controlled amount of a first portion of said second portion of solid heat exchange material which is smaller than a desired particle size and passing a second desired particle size portion of said second portion of solid heat exchange material to the upper portion of said heater zone.

6. The method of stripping shale which comprises passing stripped shale into the upper portion of a heater zone and downwardly therethrough; passing a hot combustion gas upwardly through said heater zone in direct heat exchange with said shale, whereby said stripped shale is heated; passing a first portion of said heated stripped shale into the upper portion of a superheating zone; passing a second portion of said heated stripped shale into the upper portion of a stripping zone; passing crushed oil-containing fresh shale into the upper portion of said stripping zone in direct heat exchange with said second portion of said heated stripped shale, whereby said oil-containing shale is heated; gravitating said shale portions downwardly through said stripping and superheating zones; passing an inert stripping gas in direct heat exchange with said first portion of heated stripped shale in said superheating zone, whereby said stripping gas is heated; removing said heated stripping gas from said superheating zone and passing said gas into direct heat exchange with and counter the flow of said shale in said stripping zone, whereby the combined influence of the heated stripped shale and the stripping gas decomposes kerogen in said fresh shale to form oil vapors; removing said stripping gas and said stripped products from said stripping zone in a gaseous form; removing stripped shale from said superheating zone and separating said stripped shale from shale fines; discarding said separated fines; regulating the size of said oil-containing fresh shale which is supplied to said stripping zone in response to the volume of shale fines separated from said stripped shale; removing stripped shale from said stripping zone; and passing said stripped shale from said superheating zone and said stripping zone to said heater zone.

7. The method of stripping shale which comprises passing stripped shale into the upper portion of a heater zone and downwardly therethrough; passing a hot combustion gas upwardly through said heater zone in direct heat exchange with said shale, whereby said stripped shale is heated; passing a first portion of said heated stripped shale into the upper portion of a superheating zone; passing a second portion of said heated stripped shale into the upper portion of a stripping zone; passing crushed oil-containing fresh shale into the upper portion of said stripping zone in direct heat exchange with said second portion of said heated stripped shale, whereby said oil-containing fresh shale is heated; passing an inert stripping gas in direct heat exchange with said first portion of heated stripped shale in said superheating zone, whereby said stripping gas is heated; removing said heated stripping gas from said superheating zone and passing said gas into direct heat exchange with and counter the flow of said shale in said stripping zone, whereby the combined influence of the heated stripped shale and the stripping gas decomposes kerogen in said fresh shale to form oil vapors; removing said stripping gas and said stripped products from said stripping zone in a gaseous form; removing spent shale from said superheating zone and separating said spent shale from shale fines; discarding said fines; regulating the size of said oil-containing fresh shale which is supplied to said stripping zone in response to the volume of spent shale which is supplied to said heater zone; removing stripped shale from said stripping zone; and passing said stripped shale from said superheating zone and said stripping zone to said heater zone.

8. The method of stripping shale which comprises passing stripped shale into the upper portion of a heater zone and downwardly therethrough; passing a hot combustion gas upwardly through said heater zone in direct heat exchange with said shale, whereby said stripped shale is heated; passing a first portion of said heated stripped shale into the upper portion of a superheating zone; passing a second portion of said heated stripped shale into the upper portion of a stripping zone; passing crushed oil-containing fresh shale into the upper portion of said stripping zone in direct heat exchange with said second portion of said heated stripped shale, whereby said oil-containing fresh shale is heated; passing an inert stripping gas in direct heat exchange with said first portion of heated stripped shale in said superheating zone, whereby said stripping gas is heated; removing said heated stripping gas from said superheating zone and passing said gas into direct heat exchange with said shale in said stripping zone, whereby the combined influence of the heated stripped shale and the stripping gas decomposes kerogen in said fresh shale to form oil vapors; removing said stripping gas and said stripped products from said stripping zone in a gaseous form; removing stripped shale from said superheating zone and separating said spent shale from shale fines; discarding said fines; regulating the size of shale material which is separated as fines in response to the volume of stripped shale which is supplied to said heater zone; removing stripped shale from said stripping zone; and passing said stripped shale from said superheating zone and said stripping zone to said heater zone.

9. A shale retort system which comprises in combination an upright heater chamber; solid material heating means in said heater chamber; an upright stripper chamber; a gaseous material inlet in the lower portion of said stripper chamber and a gaseous material outlet in the upper portion of said stripper chamber; a first solid material conveyor extending from the lower portion of said heater chamber to the upper portion of said stripper chamber; a second solid material conveyor extending between a solid material supply source and the upper portion of said stripper chamber; a variable crusher in said second solid material conveyor; an upright superheater chamber; a gaseous material inlet in the lower portion of said superheater chamber and a gaseous material outlet in the upper portion of said superheater chamber; a gaseous material conduit extending between the gaseous material outlet of said superheater chamber and the gaseous material inlet of said stripper chamber; a third solid material conveyor extending between the lower portion of said heater chamber and the upper portion of said superheater chamber; a separator having a fines outlet in its lower portion; a fourth solid material conveyor extending between the lower portion of said superheater and said separator; a solid material elevator; a fifth solid material conveyor extending between the lower portion of said stripper chamber and said solid material elevator; a sixth solid material conveyor extending between said separator and said solid material elevator; and a seventh solid material conveyor extending between said solid material elevator and the upper portion of said heater chamber.

10. The shale retort system of claim 9, wherein a preheater chamber is provided in said fifth solid material conveyor; a gaseous material inlet in the lower portion of said pre-heater chamber; and a gaseous material conduit extending between the upper portion of said pre-heater chamber and the lower portion of said heater chamber.

11. A shale retort system which comprises in combination an upright heater chamber; solid material heating means in said heater chamber; an upright stripper chamber; a gaseous material inlet in the lower portion of said stripper chamber and a gaseous material outlet in the upper portion of said stripper chamber; a first solid material conveyor extending from the lower portion of said heater chamber to the upper portion of said stripper chamber; a second solid material conveyor extending between a solid material supply source and the upper portion of said stripper chamber; an upright superheater chamber; a gaseous material inlet in the lower portion of said superheater chamber and a gaseous material outlet in the upper portion of said superheater chamber; a gaseous material conduit extending between the gaseous material outlet of said superheater chamber and the gaseous material inlet of said stripper chamber; a third solid material conveyor extending between the lower portion of said heater chamber and the upper portion of said superheater chamber; a separator having a fines outlet in its lower portion; a variable solid material separating means in the lower portion of said separator; a fourth solid material conveyor extending between the lower portion of said superheater and said separator; a solid material elevator; a fifth solid material conveyor extending between the lower portion of said stripper chamber and said solid material elevator; a sixth solid material conveyor extending between said separator and said solid material elevator; a seventh solid material conveyor extending between said solid material elevator and the upper portion of said heater chamber; a surge chamber in said seventh solid material conveyor; and a controller connected to said surge chamber and said variable solid material separating means.

12. The method of stripping shale which comprises heating stripped shale in a heating zone; gravitating a first portion of said heated stripped shale into the upper portion of a superheating zone; gravitating a second portion of said heated stripped shale into the upper portion of a stripping zone; passing crushed oil-containing fresh shale into the upper portion of said stripping zone in direct heat exchange with said second portion of said heated stripped shale, whereby said oil-containing fresh shale is heated; gravitating said shale portions downwardly through said stripping and superheating zones; passing an inert stripping gas in direct heat exchange with said first portion of heated stripped shale in said superheating zone, whereby said stripping gas is heated; removing said heated stripping gas from said superheating zone and passing said gas into the lower portion of said stripping zone and upwardly therethrough in direct heat exchange with said shale in said stripping zone, whereby the combined influence of the heated stripped shale and the stripping gas decomposes kerogen in said fresh shale to form oil vapors; removing said stripping gas and said stripped products from said stripping zone in a gaseous form; removing stripped shale from said superheating zone and separating a controlled amount of shale fines therefrom; regulating the size of said oil-containing fresh shale which is supplied to said stripping zone; removing stripped shale from said stripping zone; and passing said stripped shale from said superheating zone and said stripping zone to said heated zone.

13. The method of claim 12, wherein the temperature within said stripping zone is maintained within the range of between 450° F. and 1200° F.

14. The method of claim 13, wherein the shale introduced into the stripping zone is in the ratio of between 5:1 to 10:1 of fresh oil-bearing shale to stripped shale.

15. The method of claim 14, wherein the temperature within said stripping zone is maintained within the range of between 850° F. and 1050° F.

16. The method of claim 1, wherein refractory pebbles are utilized as a portion of said heat exchange medium; separating at least a portion of the shale solid heat exchange material from the refractory pebbles removed from said superheating zone; and passing said pebbles to the upper portion of said heater zone.

17. The method of claim 16 wherein said solid heat exchange medium introduced into said stripping zone is in the ratio of between 2:1 to 1:2 of fresh oil-bearing shale to said solid heat exchange medium.

18. A shale retort system which comprises in combination an upright heater chamber; solid material heating means in said heater chamber; an upright stripper chamber; a gaseous material inlet in the lower portion of said stripper chamber and a gaseous material outlet in the upper portion of said stripper chamber; a first solid material conveyor extending from the lower portion of said heater chamber to the upper portion of said stripper chamber; a second solid material conveyor extending between a solid material supply source and the upper portion of said stripper chamber; an upright superheater chamber; a variable crusher in said second solid material conveyor; a gaseous material inlet in the lower portion of said superheater chamber and a gaseous material outlet in the upper portion of said superheater chamber; a gaseous material conduit extending between the gaseous material outlet of said superheater chamber and the gaseous material inlet of said stripper chamber; a third solid material conveyor extending between the lower portion of said heater chamber and the upper portion of said superheater chamber; a separator having a fines outlet in its lower portion; a controller connected to said fines outlet and said crusher; a fourth solid material conveyor extending between the lower portion of said superheater and said separator; a solid material elevator; a fifth solid material conveyor extending between the lower portion of said stripper chamber and said solid material elevator; a sixth solid material conveyor extending between said separator and said solid material elevator; and a seventh solid material conveyor extending between said solid material elevator and the upper portion of said heater chamber.

19. A shale retort system which comprises in combination an upright heater chamber; solid material heating means in said heater chamber; an upright stripper chamber; a gaseous material inlet in the lower portion of said stripper chamber and a gaseous material outlet in the upper portion of said stripper chamber; a first solid material conveyor extending from the lower portion of said heater chamber to the upper portion of said stripper chamber; a second solid material conveyor extending between a solid material supply source and the upper portion of said stripper chamber; a variable crusher in said second solid material conveyor; an upright superheater chamber; a gaseous material inlet in the lower portion of said superheater chamber and a gaseous material outlet in the upper portion of said superheater chamber; a gaseous material conduit extending between the gaseous material outlet of said superheater chamber and the gaseous material inlet of said stripper chamber; a third solid material conveyor extending between the lower portion of said heater chamber and the upper portion of said superheater chamber; a separator having a fines outlet in its lower portion; a fourth solid material conveyor extending between the lower portion of said superheater and said separator; a solid material elevator; a fifth solid material conveyor extending between the lower portion of said stripper chamber and said solid material elevator; a sixth solid material conveyor extending between said separator and said solid material elevator; a seventh solid material conveyor extending between said solid material elevator and the upper portion of said heater chamber; a surge chamber in said seventh solid material conveyor; and a controller connected to said surge chamber and said crusher.

References Cited in the file of this patent

UNITED STATES PATENTS

| | | |
|---|---|---|
| 1,977,684 | Lucke | Oct. 23, 1934 |
| 2,396,709 | Leffer | Mar. 19, 1946 |
| 2,409,353 | Giuliani et al. | Oct. 15, 1946 |
| 2,420,376 | Johansson | May 13, 1947 |
| 2,438,728 | Tyson | Mar. 30, 1948 |
| 2,441,170 | Rose et al. | May 11, 1948 |
| 2,441,386 | Berg | May 11, 1948 |
| 2,463,693 | Huff | Mar. 8, 1949 |
| 2,480,670 | Peck | Aug. 30, 1949 |
| 2,534,051 | Nelson | Dec. 12, 1950 |
| 2,560,767 | Huff | July 17, 1951 |
| 2,639,263 | Leffer | May 19, 1953 |